United States Patent [19]
Burry et al.

[11] Patent Number: 5,088,571
[45] Date of Patent: Feb. 18, 1992

[54] MODULAR STRUCTURAL INSTRUMENT PANEL CARRIER

[75] Inventors: Donald L. Burry, Royal Oak; Leonard J. Pilato, Troy, both of Mich.

[73] Assignee: General Motors Corporation, Detroit, Mich.

[21] Appl. No.: 628,031

[22] Filed: Dec. 17, 1990

[51] Int. Cl.$^5$ .................... B60K 37/00; B62D 25/14
[52] U.S. Cl. .................... 180/90; 280/779; 296/70
[58] Field of Search .............. 180/90, 89.1; 280/779; 296/192, 70, 72, 196, 197

[56] References Cited

U.S. PATENT DOCUMENTS

| | | | |
|---|---|---|---|
| 3,456,572 | 7/1969 | Beyer et al. | 98/2 |
| 4,391,465 | 7/1983 | Piano | 296/208 |
| 4,559,868 | 12/1985 | Nonaka et al. | 98/2.08 |
| 4,582,156 | 4/1986 | Kochy et al. | 180/90 |
| 4,646,879 | 3/1987 | Mahler et al. | 180/90 |
| 4,733,739 | 3/1988 | Lorenz et al. | 180/90 |
| 5,005,898 | 4/1991 | Benedetto et al. | 296/197 |

FOREIGN PATENT DOCUMENTS

| | | | |
|---|---|---|---|
| 0141959 | 5/1985 | European Pat. Off. | 296/70 |
| 2110616 | 6/1983 | United Kingdom | 180/90 |

Primary Examiner—Kenneth R. Rice
Attorney, Agent, or Firm—Charles E. Leahy

[57] ABSTRACT

An instrument panel carrier for mounting instrument panel components in a motor vehicle is comprised of a box shaped beam extending transversely across the vehicle and defined by first and second panels connected together. The beam has ends thereof adapted for attachment to the pillars of the vehicle body so that the beam becomes an integral load carrying member of the vehicle body. The beam includes a vertical extending wall having a plurality of air flow openings therein spaced transversely along the beam to communicate air flow across the vehicle from a HVAC module. One of the panels extends rearward and generally horizontally from the beam to define a shelf structure which extends across the vehicle and cooperates with the vertical extending wall of the beam in defining a structure to receive and mount the various instrument panel components. The instrument panel carrier is configured to locate the vertical extending wall substantially forward of the occupant and the horizontal extending shelf at a relatively low position to thereby facilitate the design of uniquely configured instrument panel components which are attached to the carrier by mounting brackets designed to provide the desired mounting height and position for the particular body style.

1 Claim, 2 Drawing Sheets

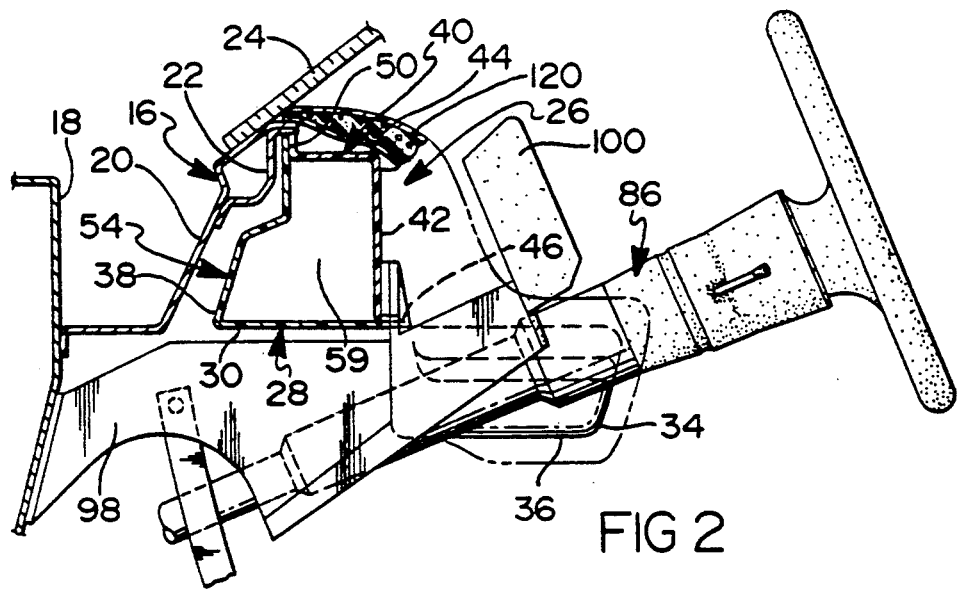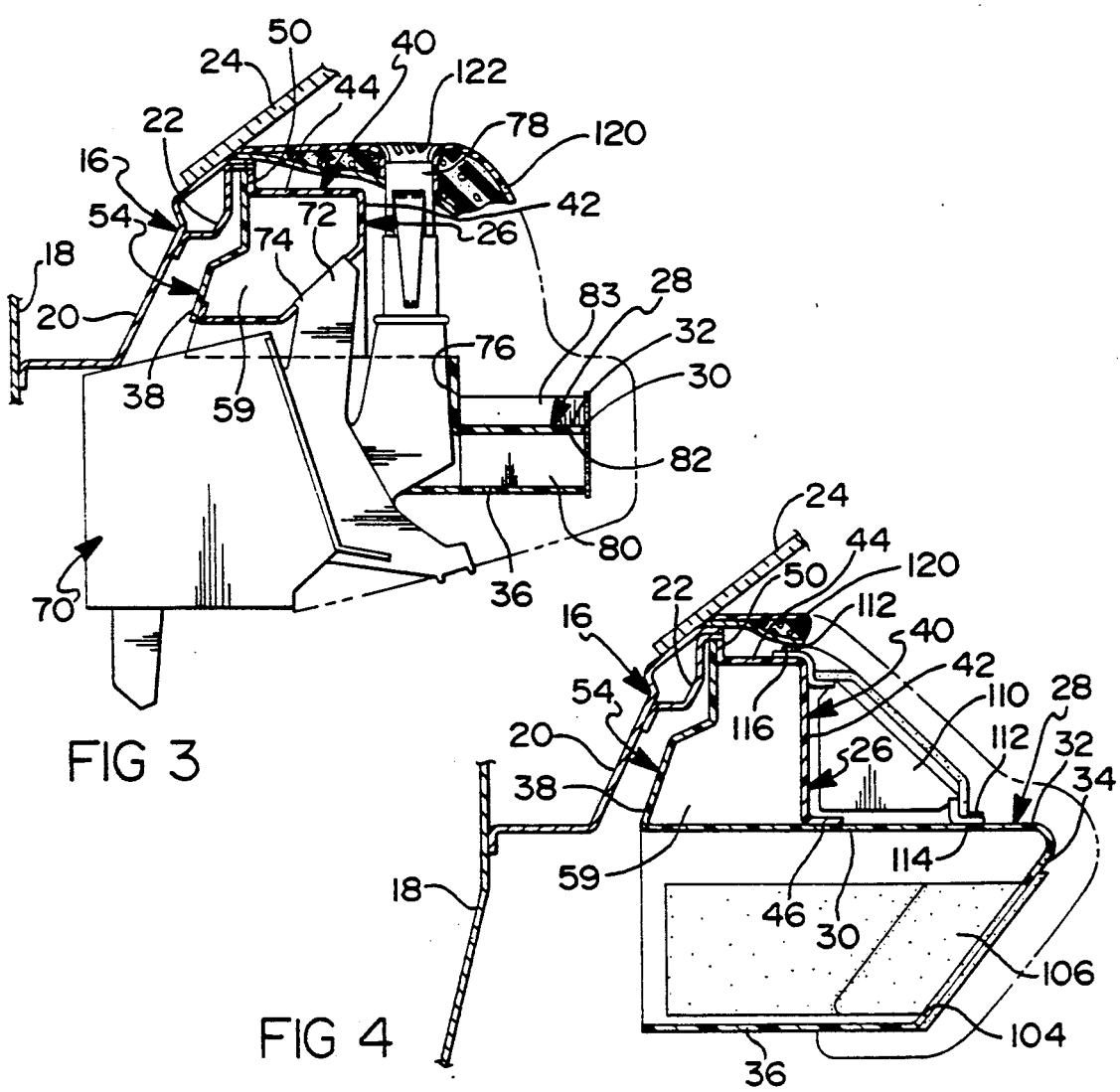

MODULAR STRUCTURAL INSTRUMENT PANEL CARRIER

The invention relates to a instrument panel construction for a vehicle body and more particularly provides panels defining a cross-car extending beam providing air flow communication and a generally horizontally extending shelf for the mounting of instrument panel components.

BACKGROUND OF THE INVENTION

Motor vehicle instrument panels are conventionally comprised of various components which are mounted on an instrument panel carrier structure which extends transversely across the car. Such components, mounted on the carrier conventionally include, an instrument cluster, glove box, ashtray, steering column, radio, HVAC controls, air outlets, etc.

It is desirable in the design and manufacture of motor vehicles to provide a uniquely styled instrument panel for each style of a vehicle body model. For example, it may be desirable to provide different instrument panel configurations between the luxury and sport editions of a particular vehicle.

Accordingly, it has heretofore been necessary to provide a uniquely engineered instrument panel carrier which is manufactured into the vehicle body and provides a mounting structure for the mounting and attachment of the instrument panel components.

A disadvantage of this need to provide a uniquely engineered instrument panel carrier is the proliferation of demand for engineering and manufacturing capability.

It would therefore be desirable to provide a standardized instrument panel carrier which could be mounted in a particular model of vehicle body and then receive uniquely designed instrument panel components which would provide the desired unique features for the particular style of the vehicle body.

SUMMARY OF THE INVENTION

Accordingly to the invention, an instrument panel carrier for mounting instrument panel components in a motor vehicle is comprised of a box shaped beam extending transversely across the vehicle and defined by first and second panels connected together. The beam has ends thereof adapted for attachment to the pillars of the vehicle body so that the beam becomes an integral load carrying member of the vehicle body. The beam includes a vertical extending wall having a plurality of air flow openings therein spaced transversely along the beam to communicate air flow across the vehicle from a HVAC module. One of the panels extends rearward and generally horizontally from the beam to define a shelf structure which extends across the vehicle and cooperates with the vertical extending wall of the beam in defining a structure to receive and mount the various instrument panel components. The instrument panel carrier is configured to locate the vertical extending wall substantially forward of the occupant and the horizontal extending shelf at a relatively low position to thereby facilitate the design of uniquely configured instrument panel components which are attached to the carrier by mounting brackets designed to provide the desired mounting height and position for the particular body style.

The first and second panels comprising the box shape beam are preferably constructed of fiber reinforced plastic. After the instrument panel components are mounted on the carrier, a conventional instrument panel cover is installed over the instrument panel and carrier to provide an aesthetically pleasing contoured cover enclosing the instrument panel components.

BRIEF DESCRIPTION OF THE DRAWINGS

These and other objects, features and advantages of the invention will become apparent upon consideration of the description of the preferred embodiment and the appending drawings in which:

FIG. 2 is a sectional view taken in the direction of arrows 2—2 of FIG. 1;

FIG. 3 is a sectional view taken in the direction of arrows 3—3 of FIG. 1; and

FIG. 4 is sectional view taken in the direction of arrows 4—4 of FIG. 1.

DESCRIPTION OF THE PREFERRED EMBODIMENT

Figure 1:
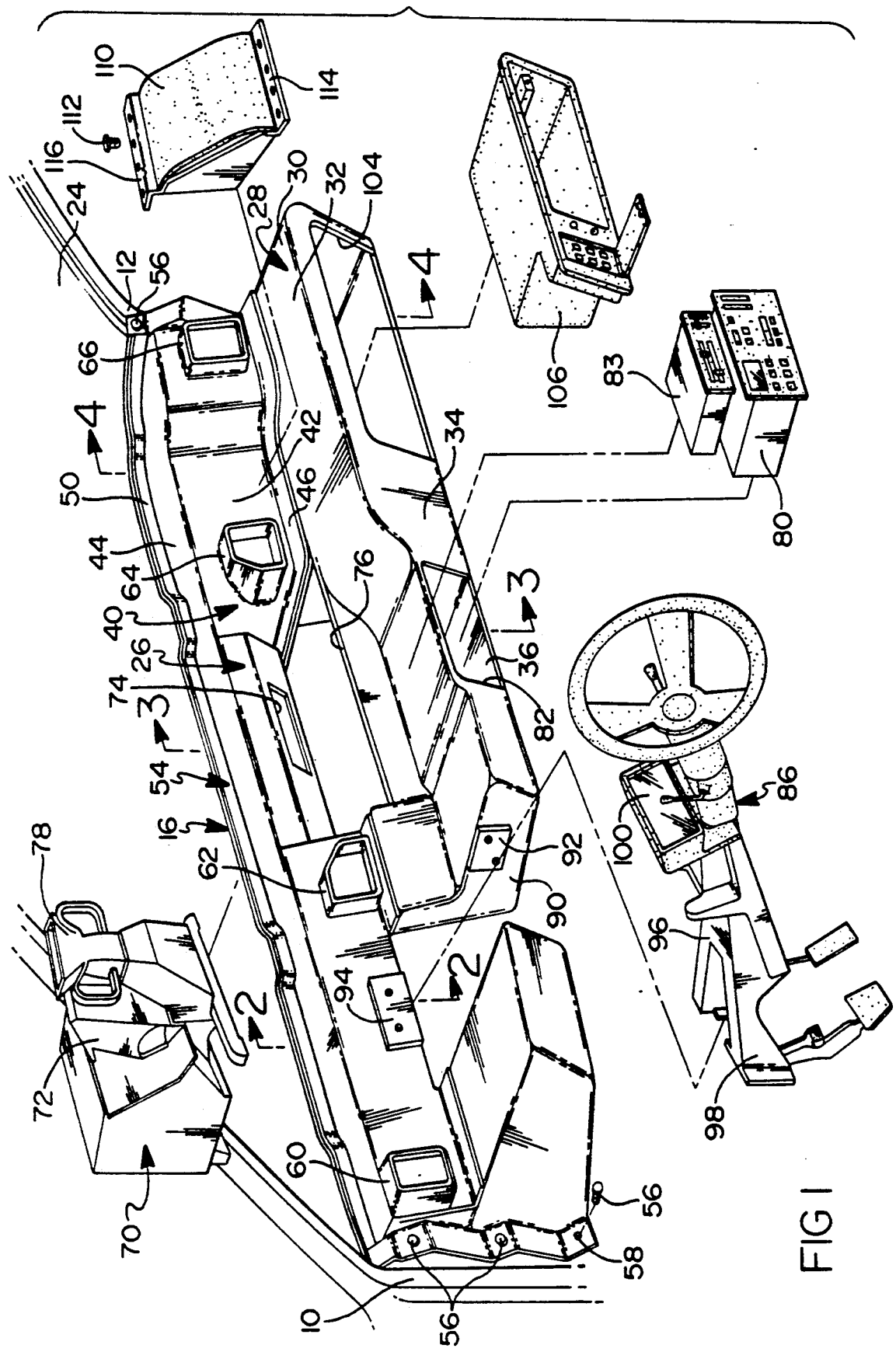
FIG. 1 is a perspective view of a instrument panel carrier according to the invention and showing various instrument panel components which are adapted to be mounted on the instrument panel carrier.

Referring to FIG. 1, a vehicle body includes a left-hand pillar 10 and a right-hand pillar 12 which are connected together by a bulkhead structure 16.

As best seen in FIG. 2, the bulkhead structure 16 is defined by a engine compartment wall 18, a plenum panel 20, and reinforcement panel 22 which are welded together and welded to the pillars 10 and 12. The leading edge of the windshield 24 is suitably attached to the panel 20.

An instrument panel carrier, generally indicated at 26, is mounted in the vehicle body for mounting the instrument panel components. The instrument panel carrier 26 includes a first panel 28 having a generally horizontal extending wall 30 which defines a shelf surface 32 extending generally horizontally across the car but stepped in height and depth as best seen in FIG. 1. The first panel 28 also has a forwardly angled rear wall 34 which depends from the horizontal wall 30. A bottom wall 36 extends forwardly toward the bulkhead 16 from the bottom edge of the rear wall 34. As best seen in FIGS. 1, 2, and 3, the first panel 28 also includes a forward wall 38 which extends upwardly from the horizontal wall 30 for attachment to the bulkhead structure 16 as will be discussed hereinafter.

Instrument panel carrier 26 also includes a second panel 40 which includes a vertical wall 42 and horizontal wall 44. As seen in FIGS. 1, 2, and 3, the vertical wall 42 has a flanged edge 46 which is attached to the horizontal surface 30 of first panel 28 and the horizontal wall 44 has a flanged edge 50 which is suitably attached to the forward wall 38 of the horizontal portion 30. Accordingly, as best seen in FIGS. 2, 3, and 4, the attachment together of the first panel 28 and second panel 40 cooperate to define a box beam assembly, generally indicated at 54, which extends transversely across the vehicle. As best seen in FIG. 1 the ends of the first panel 28 are suitable attached to the pillars 10 and 12, as by the installation of bolts 56 through apertures 58 so that the box beam 54 becomes an integral load bearing structure of the vehicle body.

As best seen in FIG. 1 the vertical wall 42 of the second panel 40 has flanged air outlet openings 60, 62, 64, and 66 spaced traversally from one another along the length thereof which communicate with the interior of the box beam structure 54 so that the box beam structure becomes an air transfer duct 59 between the outlets 60, 62, 64, and 66. As best seen in FIGS. 1 and 3, an HVAC module, generally indicated at 70, is mounted on the instrument panel 26 at the center thereof within a large opening 76 is provided in the first panel 28 to accommodate the entry and mounting of the HVAC module 70. The HVAC has a outlet duct 72 which discharges treated air into the air transfer duct 59 via a inlet opening 74 provided in the forward wall 42 of the second panel 40. The HVAC module 70 also has a defroster duct 78 which opens upwardly toward the windshield panel 24.

FIGS. 1 and 3 also show the mounting of a radio 80 through an opening 82 in the rear wall 34 of the first panel 28 and the mounting of a stereo equalizer 83 on the shelf 32.

Referring to FIGS. 1 and 2 it is seen that a steering wheel assembly generally indicated at 86 is provided for mounting on the instrument panel carrier 26. In order to accommodate the steering column assembly 86, the first panel 28 of the instrument panel carrier 26 is interrupted to define a space 90 in which the steering column assembly 86 may be installed. A suitable mounting bracket 92 is mounted on the end face of the first panel 28 and a mounting bracket 94 is mounted on the vertical wall 42 of the second panel 40. The steering column assembly 86 includes a mounting bracket 96 which is suitably bolted to the mounting brackets 92 and 94 and a brake 98 which is attached to the engine compartment wall 18. An instrument display unit 100 is mounted on the steering column assembly 86.

Referring to FIGS. 1 and 4, it is seen that the right-hand end of the instrument panel carrier 26 has a glove box cut out 104 for permitting the entry and mounting of a glove box assembly 106. The glove box assembly 106 is suitably secured to the instrument panel carrier 26 by screws. In addition, it is seen that an inflatable occupant restraint assembly 110 may be bolted to the instrument panel carrier 26 by bolts 112 which extend through mounting brackets 114 and 116.

It will be understood that the first panel 28 and second panel 40 are preferably constructed of fiber reinforced plastic material which are bonded together. These panels are preferably formed in a shape and size which is standard for the size of the vehicle body, and then any required customization for a particular body style can be provided by cutting holes in the carrier or by drilling holes for installation of fasteners. In this way, it will be appreciated that the orientation and location for the mounting of various instrument panel components may be readily changed to provide unique mounting of the various instrument panel components. For example, it will be appreciated that the occupant inflatable restraint 110 may be mounted at any desired angular relationship on the instrument panel in different body styles by simply changing the shape of the mounting brackets 114 and 116. Furthermore, if the inflatable occupant restraint is not needed in a particular model, it may be simply omitted from the assembly. Likewise, the radio 80 may be mounted on the shelf portion 30 and then the opening 82 used to mount an astray assembly. In addition, the instrument cluster 100 which is shown mounted on the steering column assembly may be mounted on the instrument panel carrier 26 and can be configured to surround the occupant.

It will be understood that the instrument panel carrier 26 becomes concealed beneath a conventional molded plastic instrument panel cover 120 shown in FIGS. 2, 3, and 4, which has various openings therein to permit the occupant access to the various instrument panel components. The cover 120 carries a defroster outlet 122 which aligns with a defroster duct 78 of the HVAC module 70. Additional outlets, now shown, are carried by the cover 120 and align with outlets 60, 62, 64, and 66.

Thus it is seen that the invention provides a new and improved instrument panel carrier assembly comprised of first and second panels mounted together to define a cross car reinforcing beam which ducts air flow across car and also provides a generally horizontal extending shelf structure to which instrument panel components may be optionally and interchangeably mounted. In this manner, a standardized instrument panel carrier may be employed to provide varied and unique mounting of instrument panel components in the motor vehicle to thereby provide economies and flexibilities in the manufacture of automobile vehicles.

The embodiments of the invention in which an exclusive property or privilege is claimed are defined as follows:

1. An instrument panel carrier for mounting instrument panel components in a motor vehicle body having a bulkhead extending between pillars, comprising:

a box shaped beam extending transversely across the vehicle and defined by first and second panels of fiber reinforced plastic connected together, said first panel being generally L-shaped and including a horizontal extending wall and a vertical extending wall, said second panel being an inverted generally L-shape and including a horizontal wall and a generally vertical wall, said panels having flanged edges bonded together to define within the box shaped beam an air flow duct extending fully across the vehicle, said box shaped beam adapted for attachment to the bulkhead and the pillars of the vehicle so that the beam is an integral member of the vehicle body;

said beam having a vertical extending wall including a plurality of air flow openings therein spaced transversely along the beam to communicate air flow across the vehicle;

and one of said panels extending rearward and generally horizontally from the beam to define a shelf structure adapted to cooperate with the vertical extending wall in defining a shelf structure to receive and mount the instrument panel components.

* * * * *